United States Patent
Chandra et al.

(10) Patent No.: US 9,883,412 B2
(45) Date of Patent: Jan. 30, 2018

(54) VERIFICATION OF A WIRELESS PROTOCOL IMPLEMENTATION

(71) Applicant: Microsoft Technology Licensing, LLC, Redmond, WA (US)

(72) Inventors: Ranveer Chandra, Kirkland, WA (US); Jinghao Shi, North Tonawanda, NY (US); Sam M. Sarmast, Redmond, WA (US); Mark A. Champion, Kenmore, WA (US); Shuvendu K. Lahiri, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/987,655

(22) Filed: Jan. 4, 2016

(65) Prior Publication Data
US 2017/0195903 A1 Jul. 6, 2017

(51) Int. Cl.
| | | |
|---|---|---|
| H04B 17/00 | (2015.01) | |
| H04W 24/06 | (2009.01) | |
| H04L 29/06 | (2006.01) | |
| H04W 24/10 | (2009.01) | |

(52) U.S. Cl.
CPC .............. *H04W 24/06* (2013.01); *H04L 69/02* (2013.01); *H04W 24/10* (2013.01)

(58) Field of Classification Search
CPC ........ H04W 24/06; H04W 24/10; H04L 69/02
USPC ..................................... 455/67.11, 69, 115.1
See application file for complete search history.

(56) References Cited

U.S. PATENT DOCUMENTS

| | | | | |
|---|---|---|---|---|
| 5,864,658 | A | * | 1/1999 | Theobald ................ H04L 29/06 714/25 |
| 6,259,911 | B1 | * | 7/2001 | Bims ..................... H04W 24/06 455/423 |
| 7,342,892 | B2 | | 3/2008 | Soon et al. |
| 7,539,489 | B1 | | 5/2009 | Alexander |
| 7,889,663 | B1 | | 2/2011 | Wright et al. |
| 8,085,685 | B2 | | 12/2011 | Olgaard |
| 8,103,998 | B2 | | 1/2012 | Craig et al. |
| 8,195,419 | B2 | | 6/2012 | Conner |
| 8,537,660 | B2 | | 9/2013 | Ramaiah et al. |
| 8,676,273 | B1 | * | 3/2014 | Fujisaki .............. H04M 1/6505 379/142.06 |

(Continued)

FOREIGN PATENT DOCUMENTS

| | | |
|---|---|---|
| CN | 101958876 B | 5/2013 |
| CN | 103476033 A | 12/2013 |

OTHER PUBLICATIONS

Zhao et al., "An Open Conformance Test System Towards the Standardization of Wireless Sensor Networks," in International Journal of Distributed Sensor Networks, Jan. 2012, 11 pages.

(Continued)

*Primary Examiner* — Md Talukder
(74) *Attorney, Agent, or Firm* — Rainier Patents, P.S.

(57) ABSTRACT

The description relates to wireless protocol verification. One example can obtain information relating to a wireless protocol and receive information relating to wireless communications associated with a wireless device. The example can compare the wireless communications with the wireless protocol and generate a verification report that conveys whether the wireless communications comply with the wireless protocol.

20 Claims, 13 Drawing Sheets

(56) References Cited

U.S. PATENT DOCUMENTS

| | | | |
|---|---|---|---|
| 8,693,351 B2* | 4/2014 | Olgaard | H04L 1/24 370/241 |
| 8,774,024 B2 | 7/2014 | Olgaard et al. | |
| 8,943,451 B2 | 1/2015 | Dwivedi et al. | |
| 9,058,463 B1 | 6/2015 | Ikram et al. | |
| 2004/0042407 A1* | 3/2004 | Karacelik | H04L 43/50 370/241 |
| 2006/0205398 A1* | 9/2006 | Seckendorf | G06Q 10/063 455/423 |
| 2006/0264178 A1* | 11/2006 | Noble | H04B 17/0085 455/67.11 |
| 2007/0234126 A1* | 10/2007 | Lu | G06F 11/3696 714/38.13 |
| 2008/0052561 A1 | 2/2008 | Hopkins et al. | |
| 2008/0240153 A1* | 10/2008 | Frank | G06Q 10/06 370/466 |
| 2009/0185528 A1* | 7/2009 | Sambhwani | H04L 1/1835 370/329 |
| 2010/0113011 A1* | 5/2010 | Gregg | H04W 24/06 455/425 |
| 2010/0190451 A1* | 7/2010 | Huber | H04W 24/08 455/67.14 |
| 2010/0235135 A1 | 9/2010 | Conner | |
| 2011/0244814 A1* | 10/2011 | Andreu | G01R 31/31722 455/90.1 |
| 2012/0014363 A1* | 1/2012 | Hassan | H04W 8/22 370/338 |
| 2012/0196644 A1* | 8/2012 | Scherzer | H04W 48/18 455/524 |
| 2013/0067093 A1* | 3/2013 | Moreno | H04L 43/50 709/226 |
| 2013/0137380 A1* | 5/2013 | Lu | H04L 1/244 455/67.14 |
| 2013/0198423 A1* | 8/2013 | Sarkar | G06F 13/385 710/74 |
| 2014/0254647 A1* | 9/2014 | Stott | H04L 43/50 375/224 |
| 2015/0382208 A1* | 12/2015 | Elliott | H04W 24/02 370/252 |

OTHER PUBLICATIONS

International Search Report and Written Opinion dated Mar. 8, 2017 from PCT Patent Application No. PCT/US2016/068169, 16 pages.

Bhargavan, Karthikeyan, "Network Event Recognition", published Feb. 18, 2014, retrieved from <<prosecco.gforge.inria.fr/personal/karthik/pubs/network-event-recognition-thesis.pdf>> on Feb. 17, 2017, 205 pages.

Viavi, "Xgig Protocol Analysis and Test Platform", published Dec. 31, 2015, retrieved from <<http://www.viavisolutions.com/sites/default/files/technical-library-items/xgigfambro-br-snt-tm-ae.pdf>> on Feb. 17, 2017, 8 pages.

Second Written Opinion dated Jul. 27, 2017 from PCT Patent Application No. PCT/US2016/068169, 10 pages.

Popovic et al., "A Statistical Approach to Model-Based Robustness Testing", Engineering of Computer-Based Systems, ECBS '07, 14th Annual IEEE International Conference and Workshops, IEEE, PI, Mar. 1, 2007, pp. 185-494, 10 pages.

Fox, Dan, "Testing UMTS: Assuring conformance and quality of UMTS user equipment", John Wiley and Sons, Ltd., published Apr. 30, 2008, pp. 115-119, 179-196, and 221.

"International Preliminary Report on Patentability Issued in PCT Application No. PCT/US2016/068169", dated Nov. 2, 2017, 11 Pages.

* cited by examiner

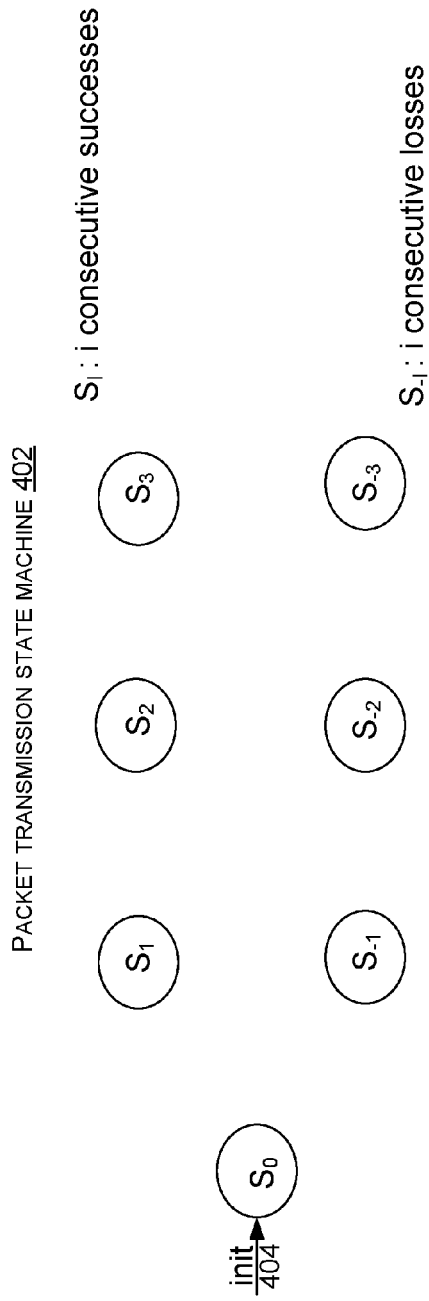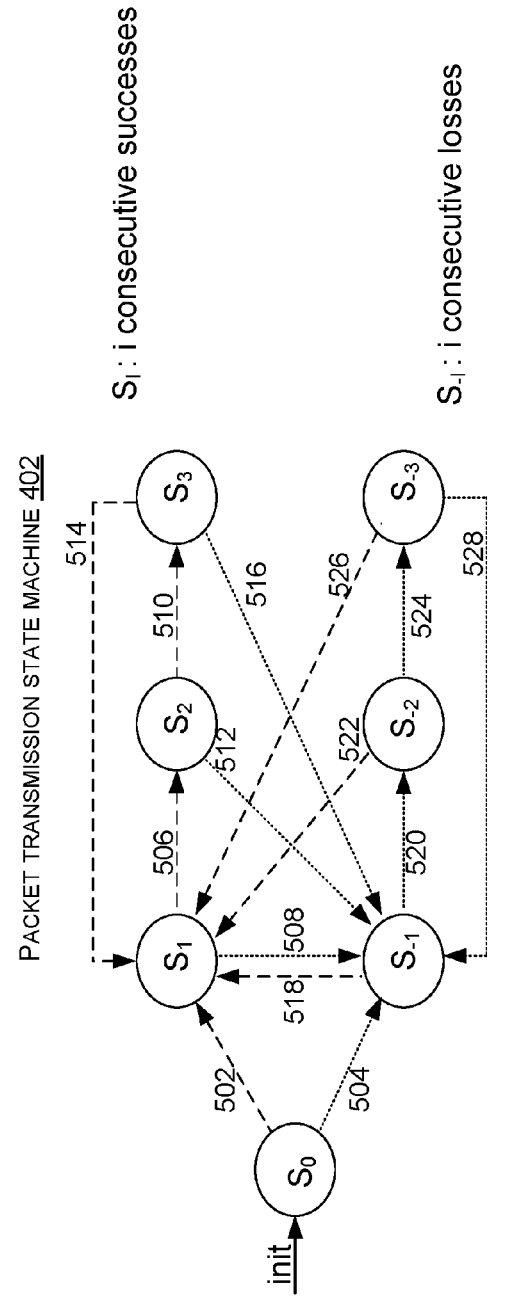

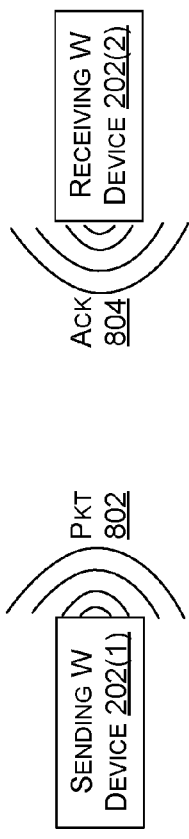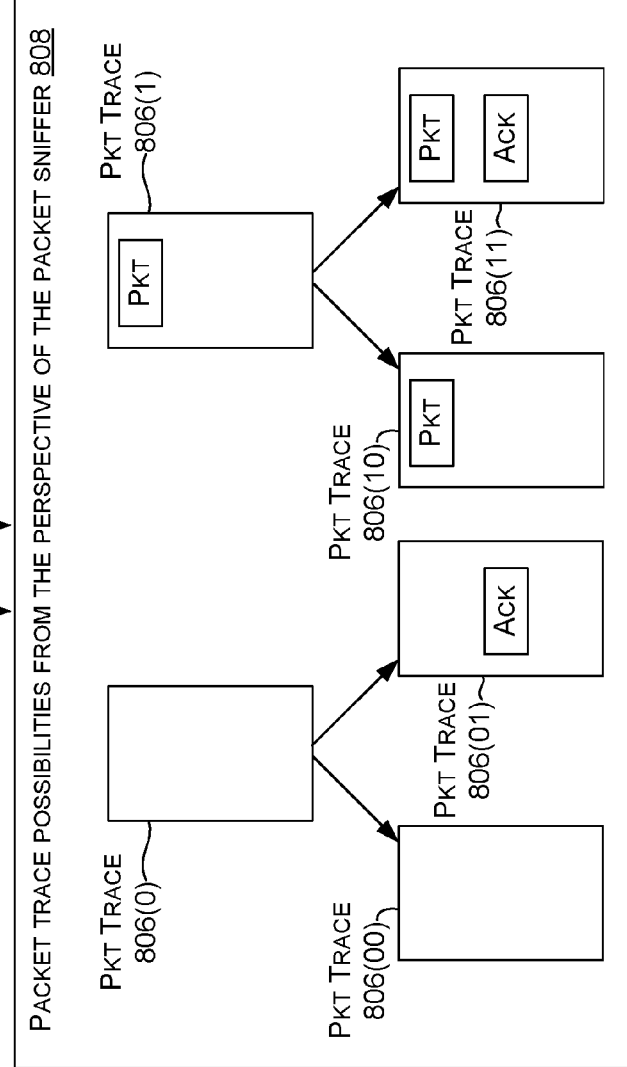
FIG. 8

VERIFICATION OF A WIRELESS PROTOCOL IMPLEMENTATION

BACKGROUND

The present concepts relate to wireless protocols and more specifically to verifying wireless protocols. Development of wireless protocols can be complex and time consuming. Once a wireless protocol is complete, products can be developed that implement the wireless protocol.

SUMMARY

The description relates to wireless protocol verification. One example can obtain information relating to a wireless protocol and receive information relating to wireless communications associated with a wireless device. The example can compare the wireless communications with the wireless protocol and generate a verification report that conveys whether the wireless communications comply with the wireless protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-3 and 8-10 show system examples in which wireless protocol verification can be employed in accordance with some implementations of the present concepts.

FIGS. 4-7 show example wireless protocol state machines in accordance with some implementations of the present concepts.

DESCRIPTION

The present concepts relate to automated verification of a wireless protocol implementation (e.g., does the wireless implementation conform to the wireless protocol?). The typical approach is manual spot checking on packet traces, or ad-hoc tools to semi-automate the spot checking process. The testing process is both time and labor consuming, error-prone, and tends to provide inconclusive results.

The present concepts can be applied in any wireless protocol implementation verification scenario. First, the wireless protocol can relate to various wireless aspects, such as which device initiates communications, the rate packets are sent, etc. From one perspective aspects can be viewed as details of the wireless protocol that have been formally specified (e.g., specifications). The aspects of the wireless protocol can relate to or define one or more assertions. The assertions can formally model behaviors of the wireless protocol implementation under certain circumstances. For instance, an assertion can be if too many packets are lost then decrease the rate that subsequent packets are sent. One or more monitors can observe operation of the wireless implementation. The observed operation can be compared to the assertions. For example, some implementations of the present concepts can take packet traces from operation of the wireless implementation as input, and report how many times each assertion from the wireless protocol is encountered and either followed or violated.

Figure 1:
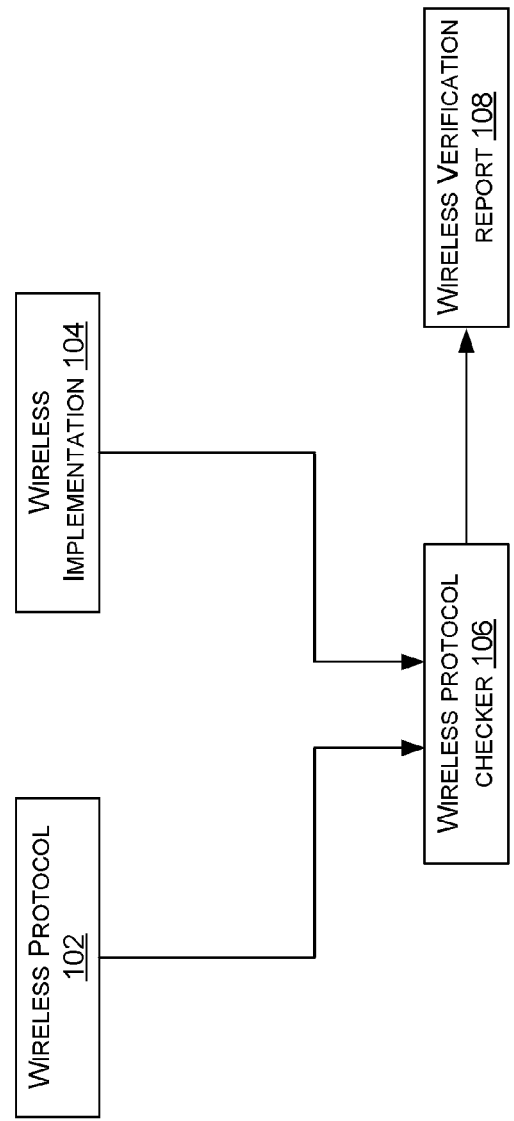
Figure 2:
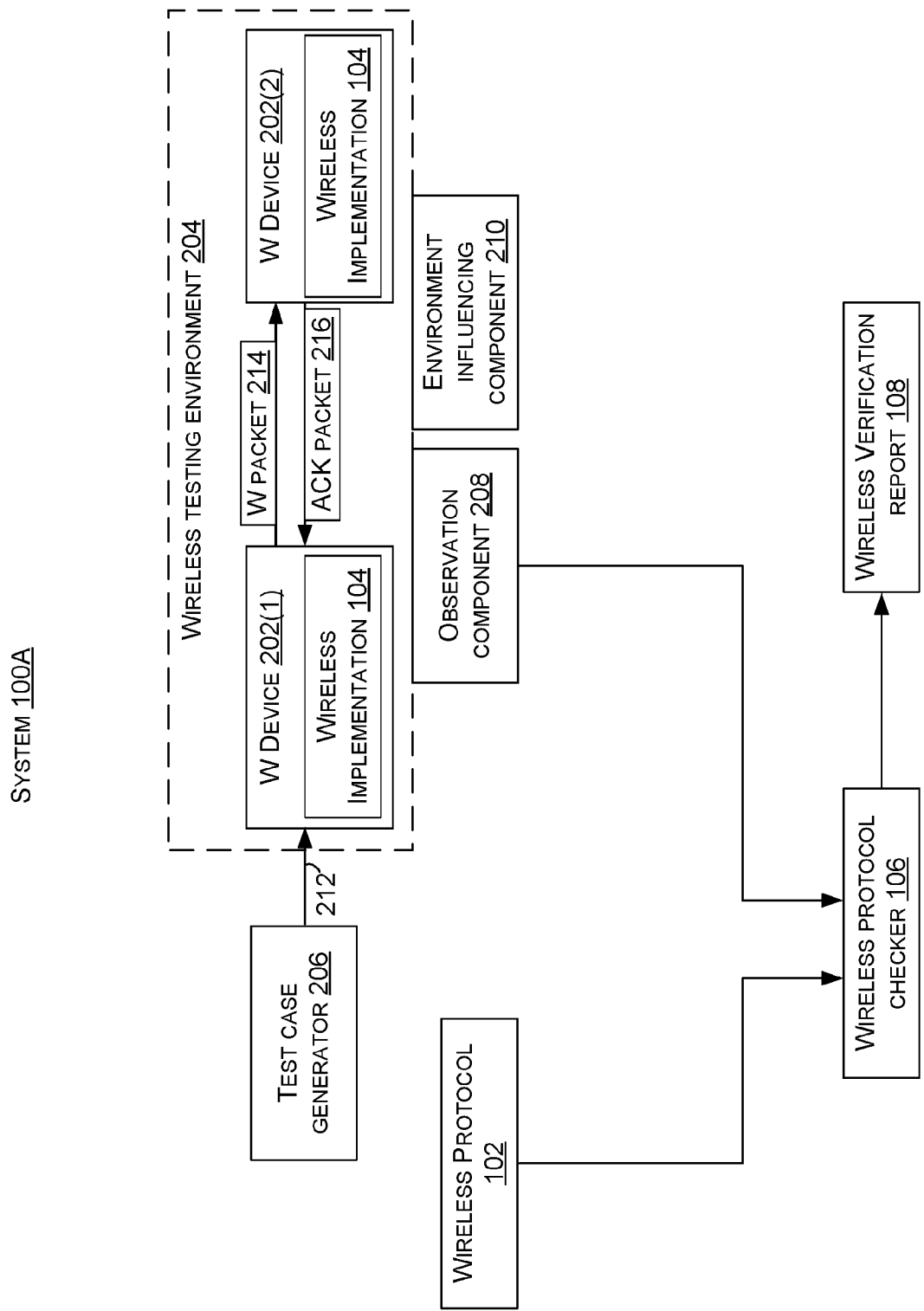
Figure 3:
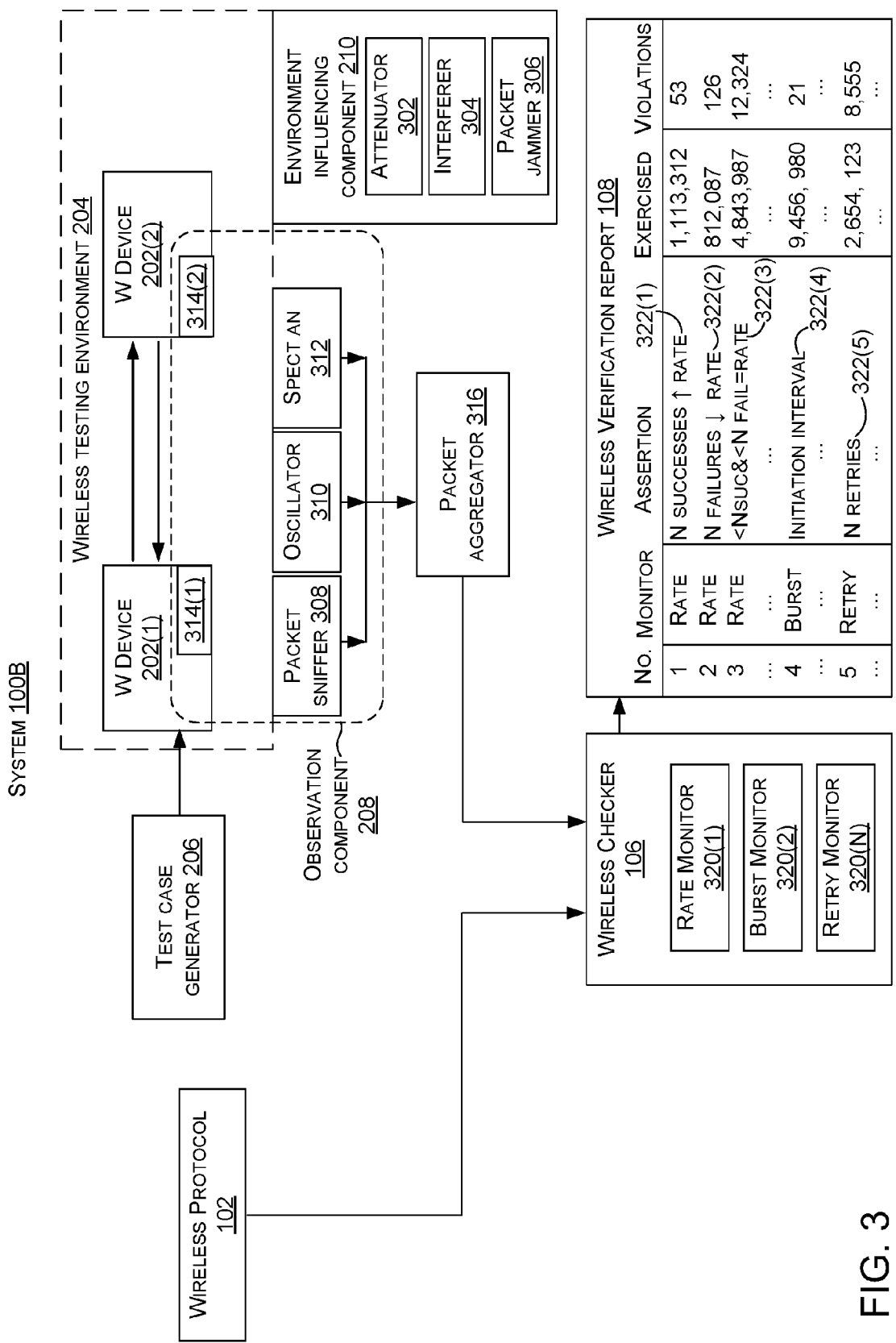

FIGS. 1-3 collectively show several system examples.

FIG. 1 shows a system 100 involving a wireless protocol 102 and a wireless implementation 104 of the wireless protocol. An automatic wireless protocol checker (hereinafter, "wireless protocol checker") 106 can compare the wireless protocol 102 to the wireless implementation 104 to determine whether the wireless implementation follows (e.g., complies with) the wireless protocol. The wireless protocol checker 106 can generate a wireless verification report 108. The wireless verification report 108 can indicate what aspects of the wireless protocol where checked and whether the wireless implementation followed/conformed to the checked aspects. Stated another way, the wireless verification report can indicate whether, relative to individual aspects of the wireless protocol, the wireless implementation encountered circumstances associated with assertions from the wireless protocol, and if so whether the assertions were followed or violated.

FIG. 2 shows another example system 100A. This system includes one or more wireless devices 202 that include the wireless implementation 104. In this case, the wireless devices are manifest as wireless device 202(1) and 202(2). Wireless device 202(1) and/or 202(2) can be thought of as devices under test (e.g., devices employing the wireless implementation that are being checked for complying with the wireless protocol). For purposes of explanation, the wireless devices can be characterized as being in a wireless testing environment 204. System 100A can also include a test case generator 206, an observation component 208, and an environment influencing component 210.

The test case generator 206 can send usage scenarios to wireless devices 202. For instance, the test case generator 206 can send data to wireless device 202(1) as indicated at 212. For example, the data can relate to test scenarios. For example, test scenario one could cause wireless device 202(1) to try to wirelessly pair with wireless device 202(2). Test scenario two could involve sending a large amount of data from wireless device 202(1) to wireless device 202(2). Test scenario three could entail wireless device 202(1) intermittently initiating communications with wireless device 202(2) and receiving data from wireless device 202(2). The wireless device 202(1) can then send a corresponding wireless packet (W packet) 214 that can be received by wireless device 202(2). If the wireless device 202(2) receives the wireless packet 214, wireless device 202(2) can send a wireless acknowledgement packet (ack packet 216) that can be received by wireless device 202(1).

Various implementations of test case generator 206 can be employed. One example implementation can be manifest as a computing device. The computing device can include a processor and memory. The memory can include instructions that when executed by the processor cause the computing device to communicate test scenario data (e.g., designated at 212) to the wireless device 202(1). The memory can also store a set of test scenarios. The computing device and/or a user can automatically select individual stored test scenarios. Alternatively or additionally, the user could supply a test scenario to the computing device.

The observation component 208 can observe the wireless testing environment 204 for the wireless packet 214 and the wireless acknowledgement packet 216. Stated another way, the observation component can detect various types of information relating to wireless communications associated with wireless devices 202. For instance, the information can relate to what packets were sent by each device, how far apart the packets were sent, which device initiated communications, interference levels, packet signal strength, etc. The observation component 208 can report its observations relative to the testing environment 204 to the wireless protocol checker 106.

The environment influencing component 210 can take various actions that affect the ability of an individual wireless device 202 to successfully receive wireless packets (e.g. for wireless device 202(2) to receive wireless packet 214 and/or for wireless device 202(1) to receive wireless acknowledgement packet 216). For example, the environment influencing component 210 can generate wireless signals that interfere with packet reception. This aspect is described in more detail below relative to FIG. 3.

FIG. 3 shows a system 100B that includes additional components. For wireless protocol testing purposes, in some testing scenarios in the wireless testing environment 204, test case generator 206 can cause wireless device 202(1) to act as a sending device and device 202(2) to act as a receiving device. Toward that end, the test case generator 206 can provide data for device 202(1) to send to device 202(2) as packets. The environment influencing component 210 can be manifest as one or more of an attenuator 302, an interferer 304, and/or a packet jammer 306. The environment influencing component 210 can influence the success of communicating wireless packets within the wireless testing environment (e.g., create interference) and/or the perceived success (e.g., block acknowledgement packets).

In one example for influencing wireless testing environment 204, packet jammer 306 can create a basal noise level that interferes with wireless device 202(1)'s ability to receive the acknowledgement packet 216 from wireless device 202(2). In another case, the packet jammer 306 can create a burst of interference that is timed to coincide with wireless device 202(2)'s sending of the acknowledgement packet. For instance, the wireless protocol may indicate that the acknowledgement packet should be sent at time T after receiving the wireless packet 214. The packet jammer may transmit an interference signal from time T−1 to time T+1 to impede wireless device 202(1) from recognizing the acknowledgement packet. This facet is described in more detail below relative to FIG. 12.

The observation component 208 can be manifest as one or more of a packet sniffer 308, an oscillator 310, a spectral analyzer 312, and/or embedded wireless components 314. In some implementations, packet sniffer 308 is a wireless sniffer, such as for Wi-Fi or Bluetooth compliant networks, among others. The wireless sniffer can detect wireless network information, channels, and/or wireless packets. Packet sniffers for wireless networks are commercially available.

Spectral analyzer 312 (e.g., spectrum analyzer) can convey frequency versus amplitude of wireless signals transmitted in the wireless testing environment 204. The spectral analyzer can provide spectra of the wireless signals, including dominant frequency, power, distortion, harmonics and/or bandwidth, among other parameters. Spectral analyzers and oscillators are commercially available. Output from the observation components can be delivered to a packet aggregator 316. The packet aggregator can merge packet traces from multiple observation components to reduce instances of missed packets (e.g., packets which were sent but not observed by the observation component 208). The packet aggregator can send the merged packet traces to the wireless checker 106.

In one example, the packet sniffer 308 can detect the transmitted packets 214 and acknowledgement packets 216 and can report this information as a packet trace either directly to the wireless checker 106 or via the packet aggregator 316. Stated another way, the packet sniffer 308 can detect wireless communications within the wireless testing environment 204 (e.g., detect packets sent by either of devices 202(1) and 202(2)).

The oscillator 310 can detect radio frequency energy levels and/or other information relating to wireless communications within the wireless testing environment 204. Spectrum analyzer 312 can measure signal magnitude and frequency within the wireless testing environment 204.

Embedded wireless components 314(1) and 314(2) can monitor what signals are sent and/or received by an individual wireless device 202. For instance, embedded wireless component 314(1) can monitor that wireless device 202(1) sent a wireless packet 214 at time zero and received another wireless packet at a subsequent time one (e.g., obtain a packet trace of communications in the wireless testing environment 204). Some embedded wireless components 314 can be more robust. For instance, the embedded wireless component may know the contents of the packets and/or be able to provide a copy of the packets. Output of the observation component 208 (e.g., wireless information, such as the packet trace) can be received by packet aggregator 316 that can organize the wireless information from the observation component for use by the wireless protocol checker 106.

The wireless protocol checker 106 can receive the wireless information from the packet aggregator 316. The wireless protocol checker 106 can also obtain the wireless protocol 102. The wireless protocol 102 can be in a language or format that allows wireless protocol verification, such as "C" or Python, among other examples.

The wireless checker 106 can check various aspects of the wireless protocol by employing or referencing one or more monitors 320. Individual monitors can analyze information from the wireless testing environment 204 relative to an aspect of the wireless protocol. In this case, the monitors include a rate monitor 320(1), a burst monitor 320(2), and a retry monitor 320(N). These are just a few of the possible monitors that can be employed and which are likely to be operating in parallel on the information from the observation component 208. The monitors 320 can be automatically generated by the wireless checker, obtained from a pre-existing list of monitors (such as may be maintained at a remote database), and/or defined by a user, such as via a graphical user interface generated by the wireless checker.

In this case, one aspect of the wireless protocol 102 can relate to a rate that one device 202 sends packets. In one example, the wireless protocol 102 can specify that the rate starts at a given rate R. The wireless protocol can further specify that if N (for example three) consecutive packets are successfully delivered, then the rate should be increased by an amount X (e.g., R+X). If N (e.g., three) consecutive packets are lost (e.g., not successfully delivered), then the rate should decrease by x (e.g., R−X), otherwise the rate should remain at R. These specified aspects can be viewed as assertions 322, respectively. The rate monitor 320(1) can monitor the packet trace from the observation component 208 to determine whether these assertions are encountered in the packet trace, and if so whether the assertions were followed or violated. Assertions 322(1)-322(3) are discussed below relative to FIG. 6. The test case generator 206 and the environment influencing component 210 can operate to ensure that assertions are encountered in the communications between the wireless devices. In some implementations the test case generator 206 and the environment influencing component 210 can be controlled by the wireless checker 106 to cause specific assertions to be exercised. For instance, the wireless checker could cause packet jammer 306 to take actions to block receipt of acknowledgement packets 216 by the wireless device 202(1) to see if the wireless device slows the packet rate.

In some implementations, the rate monitor 320(1) can input the packet trace into a state machine that represents the aspect of the wireless protocol 102. The results can be compared to the assertion(s) 322 about the aspect to determine whether the implementation is complying with the wireless protocol. Several examples explain the use of state machines for comparison of the wireless protocol to the wireless implementation.

Figure 6:
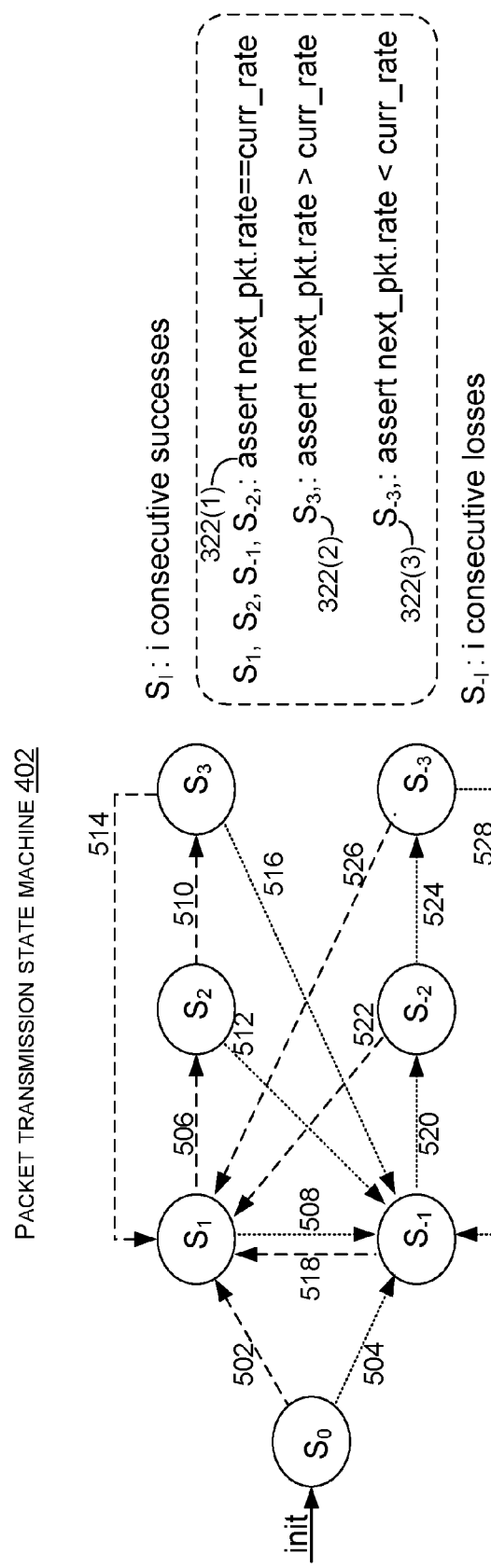

FIGS. 4-6 collectively show a state machine 402 that relates to packet transmission rates. This particular packet transmission state machine specifically relates to whether consecutive wireless packets are successfully communicated or are lost as observed by the observation component (208, FIG. 3) and analyzed by rate monitor (320(1), FIG. 3). State machine 402 initializes at $S_0$ as indicated generally at 404. Successful wireless packets are represented in a positive state and lost packets are represented as a negative state. Thus, the first packet (from wireless device 202(1)) is represented as $S_1$ if it is successfully communicated to wireless device 202(2) or as $S_{-1}$ if it is lost.

In FIG. 5, successful communications are represented by dashed lines and unsuccessful communications (e.g., lost packets) are represented by dotted lines. Thus, if the first packet communication is successful, the state proceeds according to arrow 502, and if the first packet communication is unsuccessful, the state proceeds according to arrow 504.

Looking at the successful state of arrow 502, the next packet communication will either be successful or unsuccessful. If successful, the state proceeds according to arrow 506 to $S_2$, and if unsuccessful the state proceeds according to arrow 508 to $S_{-1}$. Following arrow 506, the second packet will either be successful as represented by arrow 510 or lost as represented by arrow 512. Following arrow 510, the third packet $S_3$ can either be successful as represented by arrow 514 or lost as represented by arrow 516. In the case of arrow 514, three consecutive packets were successfully sent, and the state returns to $S_1$. In the other cases where the second or third packet was lost (e.g. arrows 512 and 516, respectively), the state is at $S_{-1}$.

The state can arrive at $S_{-1}$ via an initial packet failure as represented by arrow 504 or by successive packet failures represented by arrows 508, 512, and 516. At this state $S_{-1}$, if the next packet communication is successful the state proceeds according to arrow 518, and if the packet fails the state proceeds according to arrow 520 to state $S_{-2}$. At the second failure $S_{-2}$, the next packet will either be successful and the state will proceed according to arrow 522 to $S_1$, or the packet will fail and the state will proceed according to arrow 524 to state $S_{-3}$. At state $S_{-3}$ the next packet is either successful and the state will proceed according to arrow 526 to $S_1$, or the packet will be lost (e.g., the third consecutive failure) and the state returns to $S_{-1}$ according to arrow 528. Thus, in state machine 402 one of three conditions can occur: first, three consecutive packets can be successfully communicated; second, three consecutive packets can be lost; or third, packet successes and losses are intermixed such that the first two options are not achieved.

FIG. 6 shows the packet transmission state machine 402 as described relative to FIG. 5 and adds rate assertions 322(1)-322(3) (written in a more complete form). Looking at the unsuccessful state of the first packet represented by arrow 504, the second packet will either be successful as per arrow 518 or unsuccessful per arrow 520. Analyzing the packet stream (represented by arrows 502-528) can allow a determination to be made relating to how many times the packet stream encountered or exercised the assertions and whether the assertions were followed when encountered. This analyzing can be performed by rate monitor (320(1), FIG. 3). Thus, at $S_1$, $S_{-1}$, $S_2$, and $S_{-2}$ assertion 322(1) indicates that the next packet should be sent at the current packet rate. When $S_3$ is encountered, assertion 322(2) indicates that the next packet should be sent at a higher packet rate. When $S_{-3}$ is encountered, the next packet should be sent at a slower packet rate (assertion 322(3)).

An example rate monitor implementation is provided below.

```
01      class RateMonitor(Monitor):
02          def __init__(self):
03              self.consec_success = 0
04              self.consec_loss = 0
05              self.curr_rate = None
06              self-assertion = RateUpAssertion(self)
07
08          def transition(self, pkt):
09              self.assertion.do_assert(pkt)
10              self.next(pkt)
11
12          def next(pkt):
13              self.consec_success %= 3
14              self.consec_loss %= 3
15              if pkt.acked:
16                  self.consec_success += 1
17                  self.consec_loss = 0
18              else:
19                  self.consec_success = 0
                    self.consec_loss += 1
                    self.curr_rate = pkt.rate
```

An example rate assertion is provided below.

```
01      class RateUpAssertion(Assertion):
02          """"Rate should be increased after
03          3 consecutive successes."""""
04
05          def __init__(self, mon):
06              self.mon = mon
07
```

```
08        def condition(self, pkt):
09            return self.mon.consec_success == 3
10
11        def assertion(self, pkt):
12            return pkt.rate > self.mon.curr_rate
13
14        def do_assert(self, pkt):
15            if self.condition(pkt):
16                self.exercised += 1
17                if not self.assertion(pkt):
18                    self.violated += 1
```

Figure 7:
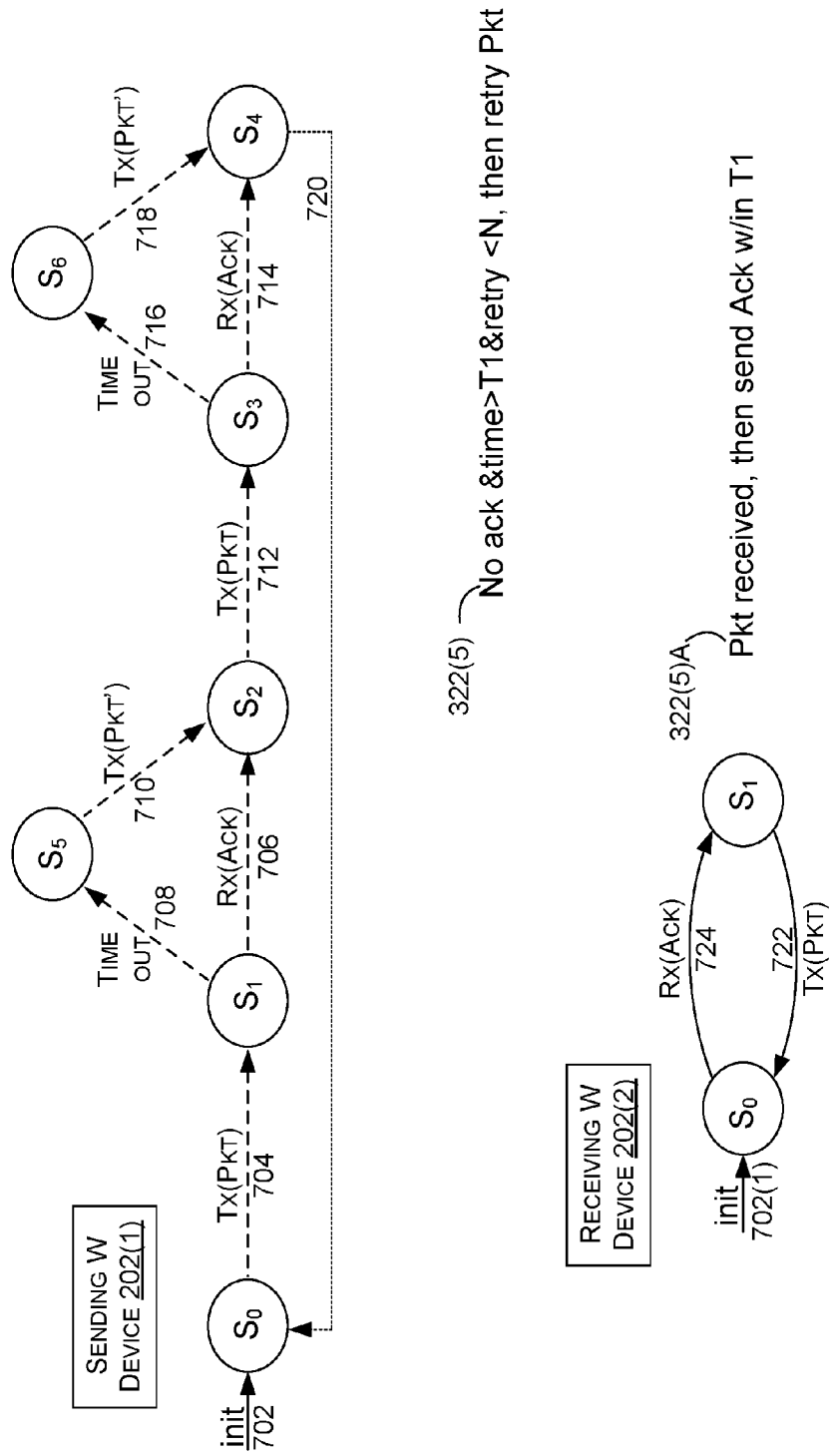

FIG. 7 shows another state machine in the form of a packet retry state machine 402(1) associated with retry monitor (320(N), FIG. 3). In this case, the protocol aspect relates to the number or retries for a packet. The protocol specifies action for the sending wireless device 202(1) and the receiving wireless device 202(2). In relation to the sending wireless device the protocol specifies that upon initialization 702, the sending wireless device 202(1) can transmit a packet (Tx Pkt) as indicated at arrow 704. If the sending wireless device receives an acknowledgement (Rx Ack) within time period T_1 then the sending wireless device can send another packet as per arrow 706. If time period T_1 elapses without receiving the acknowledgement then the sending wireless device can proceed as indicated by arrow 708 and can resend the packet (Tx Pkt') as indicated by arrow 710.

At this point, another packet can be sent as indicated by arrow 712. Either an acknowledgement will be received within the time period as indicated by arrow 714 or the time period will time out without receipt of the acknowledgement as indicated by arrow 716. The packet can then be resent as indicated by arrow 718. This process can be repeated N number of times (e.g., in this case two times (N equals 2)), and then the process can restart as indicated by arrow 720.

On the receiving wireless device side, upon initialization 702(1), the receiving wireless device 202(2) can alternatively receive a packet as indicated by arrow 722 and send an acknowledgement as indicated by arrow 724 within time T_2 (T_2<T_1).

A sender side assertion is shown at 322(5). The assertion indicates that if no acknowledgement is received and time is greater than time T1 and the number of retries is less than N, then the sending device 202(1) should retry the packet.

The sending wireless device 202(1) can violate the assertion if it does not retry the packet correctly, does not wait long enough for acknowledgement, and/or retries more than N times.

A receiving side assertion is shown at 322(5)A and indicates that if a packet is received, an acknowledgement should be sent within time T1.

The receiving wireless device 202(2) can violate the assertion if it sends an acknowledgement without receiving the packet and/or does not send acknowledgement upon receiving packet within time T1.

Further, while not illustrated, the burst monitor (320(2), FIG. 3) can utilize a similar state diagram and assertions. For instance, the burst aspect of the wireless protocol 102 can assert that all communications should be initiated by an initiating wireless device, such as wireless device 202(1), that the initiating wireless device should initiate communications every T seconds, such as 10 milliseconds, and that upon initiating communications, the initiating wireless device should allow the responding wireless device 202(2) to complete all communications before initiating again. The wireless packet trace can be compared to these assertions to determine if the assertions are being exercised and followed. Note also that for ease of explanation a single monitor is described at a time, but multiple monitors are likely operating on the packet traces in parallel and testing hundreds of assertions per second.

From one perspective, the implementations described above can provide formal abstraction of the wireless protocol 102 as monitors and assertions and can automate verification of the wireless implementation 104 through an expansive exploration of the state space. Further, the present concepts include a recognition that the observation component (208, FIG. 3) may not perfectly capture occurrences in the wireless testing environment 204. For instance, the packet sniffer (308, FIG. 3) may miss wireless packets and/or acknowledgements. The present implementations can address inaccuracies that can be introduced by the observation component 208. One example relating to packet traces obtained by packet sniffer 308 is described below.

Note that packet traces may be incomplete or inaccurate. These inaccurate packet traces can produce false positives and/or false negatives. For instance, FIG. 8 shows a scenario involving some of the components of system 100B. In this case, sending wireless device 202(1) can send a packet 802. Receiving wireless device 202(2) can receive the packet and send an acknowledgement packet 804. Packet sniffer 308 can be observing the wireless devices 202 to generate a packet trace 806. Packet trace possibilities are shown generally at 808. Initially, the packet sniffer will either miss packet 802 and generate packet trace 806(0) or detect the packet and generate packet trace 806(1). In the first instance (e.g., where the packet sniffer misses the packet), the packet sniffer will either miss the acknowledgement packet to produce packet trace 806(00) or detect the acknowledgement to produce packet trace 806(01). In the second instance (e.g., where the packet sniffer detects the packet) the packet sniffer will either miss the acknowledgement packet to produce packet trace 806(10) or detect the acknowledgement packet to produce packet trace 806(11). The present concepts recognize that the packet trace may not truly reflect all facets of communications within the wireless testing environment and the present implementations can include strategies for addressing this difficulty. First, multiple different types of observation components may be utilized in parallel rather than relying on a single source for the packet trace. Further, the wireless checker 106 can attempt to determine what actually happened (e.g., which state actually occurred). Among other techniques this can be accomplished via probability and/or tracking all possible states until subsequent information indicates which state is correct.

Thus, from one perspective, the present implementations offer enhancements of the monitored state transitions. One example enhancement can relate to a maximum likelihood state transition and another example enhancement can relate to a parallel state transition with pruning.

Relative to the maximum likelihood state transition, at each step, the packet trace system can choose the state transition which increases (and potentially maximizes) the posterior likelihood of the state transition, based on a measured packet loss ratio from the wireless implementation 104. The system 100B can report violations of the wireless protocol 102 as well as the confidence of the violation to help inspectors (e.g., users) prioritize the results. One technique for determining the maximum likelihood state transition can be accomplished by employing Bayes' Theorem.

In this case, packet (P) success (S) versus packet failure (F) probability can be represented as P(S)/P(F). Packet trace (T) probability can be represented as P(T)=P(T|S)P(S)+P(T|F)P(F). Bayes's Theorem can be used to determine given a trace P(S|T) how likely did the packet go through (e.g., was successfully received).

$$P(S|T)=P(S)P(T|S)/P(T)=P(S)P(T|S)/(P(T|S)P(S)+P(T|F)P(F))$$

Stated another way, the maximum likelihood state transition can determine all potential traces and assign probabilities to individual traces. For instance, in reference to the packet trace possibilities 808, in some scenarios the probability that a packet is received by the receiving wireless device 202(2) can be 90%, and the probability that the packet is received by the packet sniffer 308 is 90%. Thus, the probability of packet trace 806(0) is 0.1, and the probability of packet trace 806(1) is 0.9. When the receiving wireless device 202(2) is considered, the probability of packet trace 806(00) (e.g., missed by both the packet sniffer and the receiving wireless device) is 0.1×0.1, which equals 0.01 or one percent. The probability of packet trace 806(01) is 0.1×0.9, which is 0.09 or nine percent. The probability of packet trace 806(10) is 0.9×0.1, which is 0.09 or nine percent. The probability of packet trace 806(11) is 0.9×0.9, which is 0.81 or 81 percent. Thus, the maximum likelihood state transition can track all possibilities and determine their relative probabilities.

Another example enhancement can relate to a parallel state transition with pruning. Some parallel state implementations can build upon the maximum likelihood state transition described above. In each step, instead of choosing only one state transition (with the maximum likelihood), the packet trace system can perform all possible state transitions in parallel, (potentially annotated by the transition likelihood). Later on, when the system sees more packets in the future, domain knowledge can be applied to prune out false state transitions. In other words, the system will explore the "frontier" of all possible state transitions. Other parallel state implementations do not utilize the maximum likelihood state transition information and instead track all possible traces until individual traces can be pruned (e.g., subsequent occurrences indicate the individual trace is erroneous (did not occur)). One such implementation is shown in FIG. 9.

Figure 9:
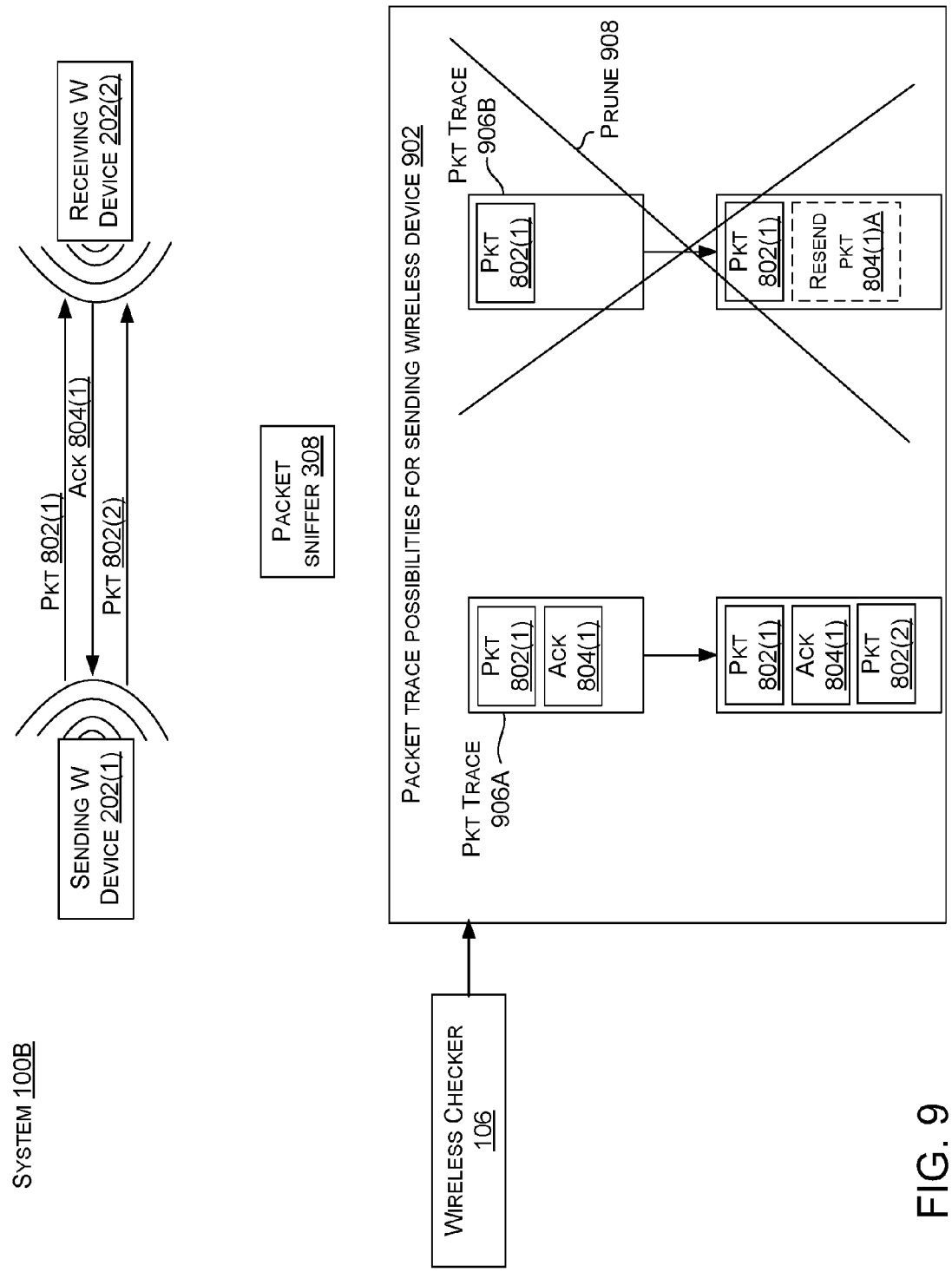

FIG. 9 shows system 100B where the packet sniffer 308 detects packet 802(1) sent by sending wireless device 202(1) and a corresponding acknowledgement 804(1) sent by receiving wireless device 202(2). When evaluating the sending wireless device 202(1), the wireless checker 106 can determine packet trace possibilities for the sending wireless device at 902. In this case, two packet traces are possible: either the sending wireless device received the acknowledgement 804(1) as evidenced in packet trace 906A or the sending wireless device missed the acknowledgement as evidenced in packet trace 906B. As mentioned above, in some scenarios it is more likely that the sending wireless device received the acknowledgement. However, this implementation can track both possibilities until definitive information is received. If the sending wireless device received the acknowledgement it will send the next packet, otherwise it will resend the current packet (e.g., resend packet 804(1) A. In this example, the sending wireless device 202(1) sends packet 802(2). This information can be used as an indicator that the sending wireless device received the acknowledgement. Using this information, the wireless checker can prune packet trace 906B as indicated at 908. In contrast, if rather than sending packet 802(2) the sending wireless device had resent packet 804(1)A, then the other possibility could be pruned.

Figure 10:
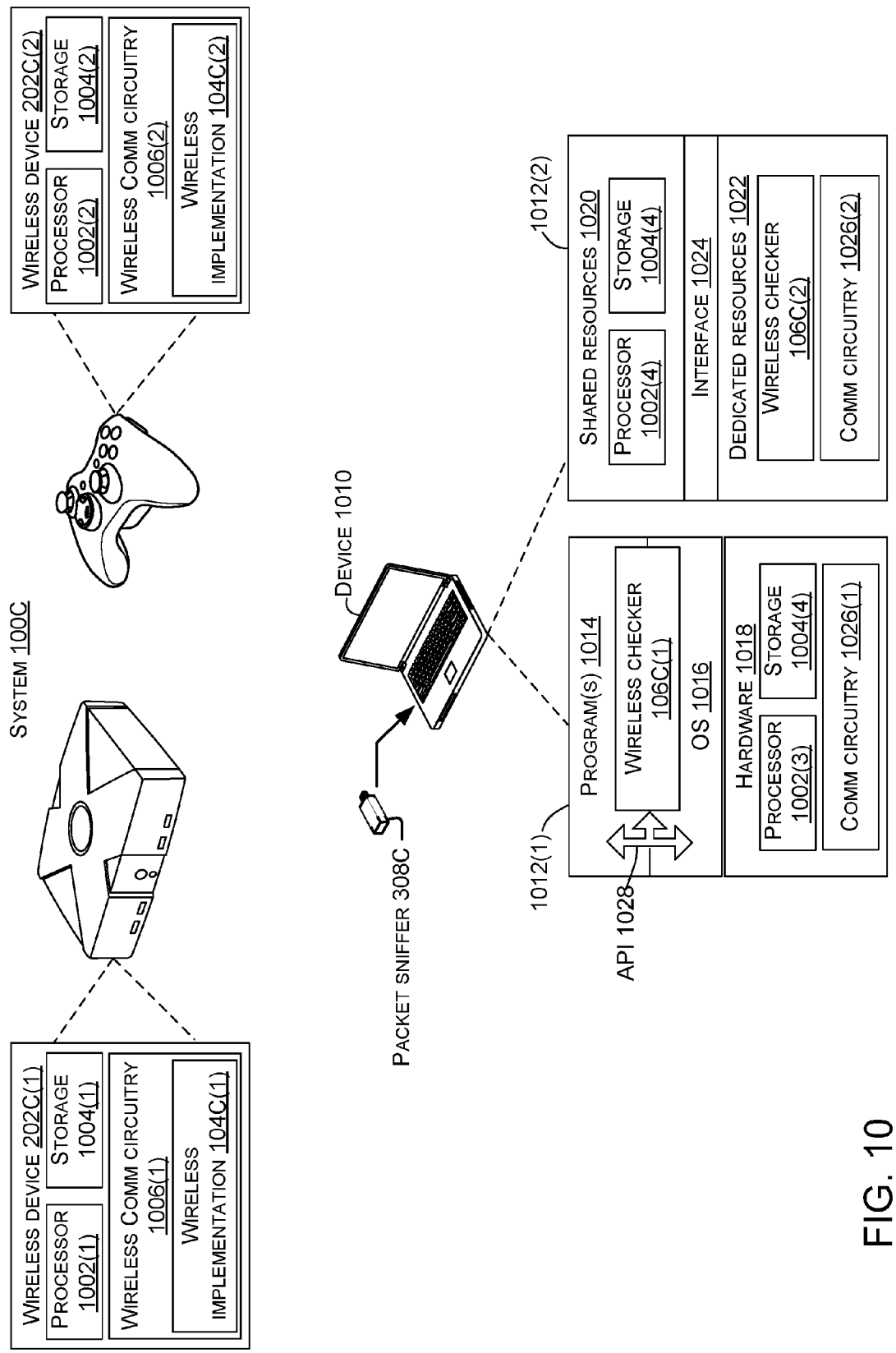

FIG. 10 illustrates an example system 100C that shows example device implementations. In this case, wireless device 202C(1) is manifest as an entertainment console and wireless device 202C(2) is manifest as an entertainment controller. These example devices are provided for purposes of explanation and are intended to be representative and not limiting. Devices 202C can include a processor 1002, storage 1004, and/or wireless communication circuitry 1006. The wireless communication circuitry 1006 can include a wireless implementation 104C. The wireless implementation can be manifest as instructions and/or circuitry that cause the wireless communication circuitry to perform specific functions. In one implementation, the wireless implementation can be manifest as software or firmware that when executed causes the wireless communication circuitry to perform specific functions. In other implementations, the wireless implementation can be implemented as part of the wireless circuitry, such as a dedicated chip, an application specific integrated circuit (ASIC), or field programmable gate array (FPGA), among others.

System 100C also includes packet sniffer 308C manifest as a USB dongle and device 1010 manifest as a notebook computer. The packet sniffer 308C can detect wireless communications between wireless devices 202C and provide the detected wireless communication to device 1010.

The device 1010 can be manifest as one of two illustrated configurations 1012(1) and 1012(2), among others. Briefly, configuration 1012(1) represents an operating system centric configuration and configuration 1012(2) represents a system on a chip configuration. Configuration 1012(1) is organized into one or more applications or programs 1014, operating system 1016, and hardware 1018. Configuration 1012(2) is organized into shared resources 1020, dedicated resources 1022, and an interface 1024 there between. In either configuration, the device 1010 can include processor 1002, storage/memory 1004, wireless checker component 106C, and/or communication circuitry 1026. The communication circuitry can be wired or wireless communication circuitry that allows the device to communicate (e.g., send and/or receive) data with other devices. For instance, the communication circuitry could include USB circuitry, Ethernet circuitry, Wireless circuitry, such as Wi-Fi (e.g., 802.11x), Bluetooth, and/or Cellular, among others. Individual devices can alternatively or additionally include other elements, such as input/output devices, displays, buses, etc., which are not illustrated or discussed in detail here.

In one operating system centric configuration 1012(1), the wireless checker 106C(1) can be a freestanding program or embedded in program 1014 and/or operating system 1016. The wireless checker can make calls to the hardware 1018 via an application program interface (API) 1028 to hardware drivers (not shown).

In an alternative implementation, device 1010 can be manifest as a SOC configuration, such as an application specific integrated circuit (ASIC) that includes wireless checker 106C(2).

From one perspective, any of devices 202C and/or 1010 can be viewed as computers. The term "device," "computer," or "computing device" as used herein can mean any type of device that has some amount of processing capability and/or storage capability. Processing capability can be provided by one or more processors that can execute data in the form of computer-readable instructions (e.g., computer-executable instructions) to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 1012(2) can be viewed as a system on a chip (SOC) type design. In such a case, functionality provided by the device can be integrated on a single SOC or multiple coupled SOCs. Processors 1002(4) can be configured to coordinate with shared resources 1020, such as memory/storage 1004(4), etc., and/or one or more dedicated resources 1022, such as hardware blocks configured to perform certain specific functionality. Thus, the term "processor" as used herein can also refer to central processing units (CPUs), graphical processing units (GPUs), controllers, microcontrollers, processor cores, or other types of processing devices. The wireless checker 106C(2) can be manifest as dedicated resources 1022 and/or as shared resources 1020.

Generally, any of the functions described herein can be implemented using software, firmware, hardware (e.g., fixed-logic circuitry), or a combination of these implementations. The term "component" as used herein generally represents software, firmware, hardware, circuitry, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 11:
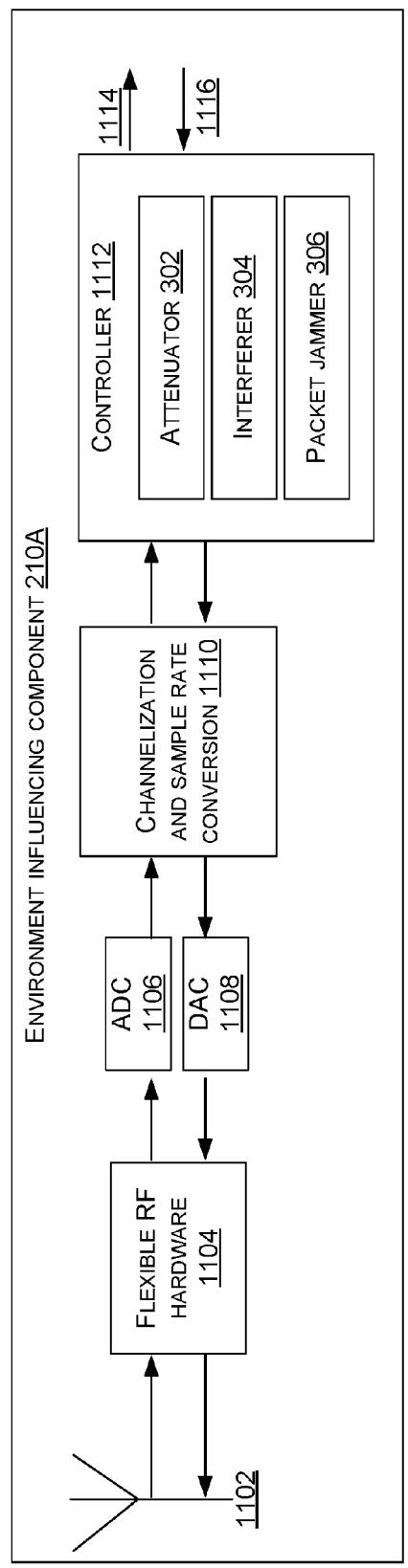
FIG. 11 shows an example environment influencing component in accordance with some implementations of the present concepts.

FIG. 11 shows additional details of an example environment influencing component 210A manifest as a software defined radio. In this case, the environment influencing component includes an antenna 1102, flexible radio frequency (RF) hardware 1104, an analog-to-digital converter 1106, a digital-to-analog converter 1108, a channelization and sample rate conversion element 1110, and a controller 1112. The controller can include any one or more of attenuator 302, interferer 304, and/or packet jammer 306. The controller can output reports at 1114 and receive user input, such as which channels to block, at 1116.

Figure 12:
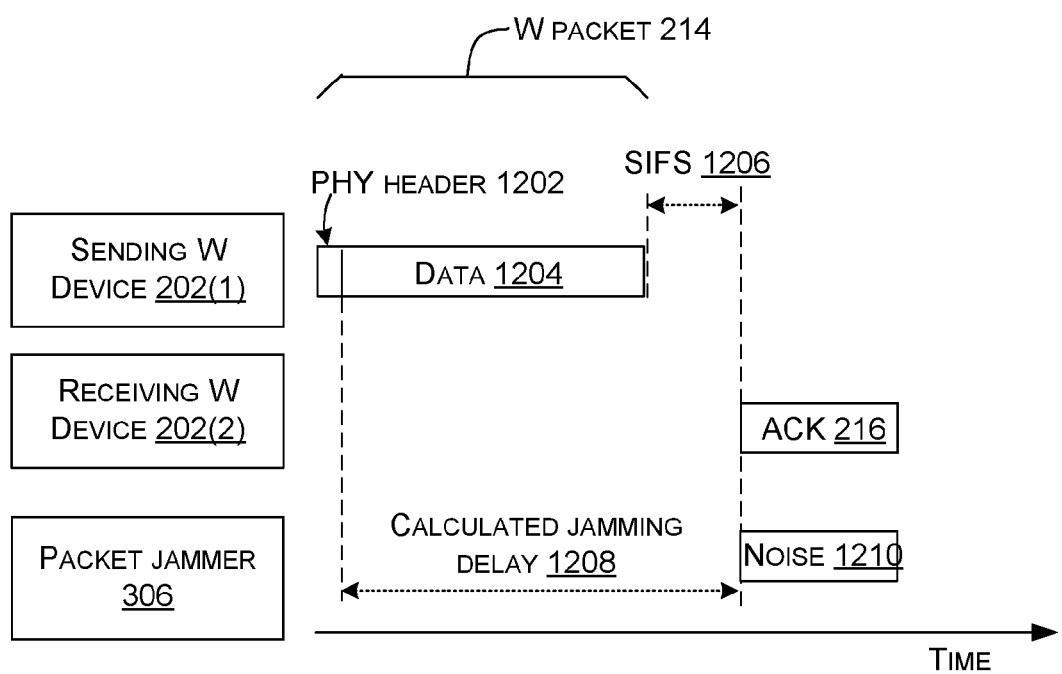
FIG. 12 shows an example packet jammer in accordance with some implementations of the present concepts.

FIG. 12 shows a timeline progressing from left to right that shows an example of how the packet jammer 306 can affect communications within the wireless testing environment (204, FIG. 3). In this example the packet jammer can detect wireless packet 214 transmitted by sending wireless device 202(1). The packet jammer can analyze the physical header (PHY header) 1202 of the wireless packet to determine a length of the following data 1204. More specifically, the physical header can define a synchronization sequence, a modulation scheme (e.g., bitrate), and/or packet length (e.g., number of data bits). The wireless protocol 102 can define a short interface space (SIFS) duration 1206 that should follow the transmission before the receiving device should send acknowledgement packet 216. (This example is a 802.11x example. Other wireless protocols can define similar durations). The packet jammer can calculate jamming delay 1208. First, the number of data bits are divided by the bitrate (e.g., this is the data duration 1204). The quotient (e.g., the data duration) is then added to the SIFS duration 1206 to produce the calculated jamming delay 1208. The packet jammer can transmit competing signals (e.g., noise 1210 at the end of the calculated jamming delay to interfere with the sending wireless device 202(1)'s ability to receive the acknowledgement 216 from the receiving wireless device 202(2). Thus, from one perspective, the packet jammer can be viewed as a 'packet dropper' or a 'packet shaper' that affects signals received in the wireless testing environment.

Figure 13:
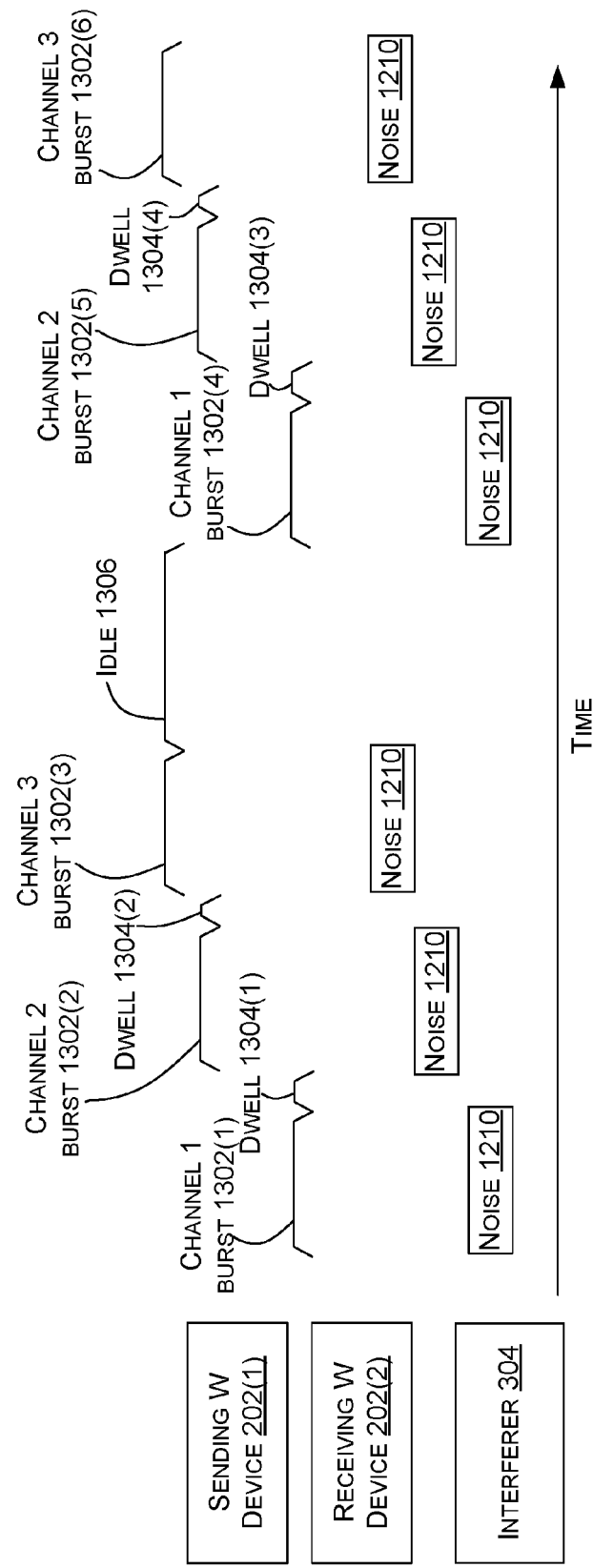
FIG. 13 shows an example interferer in accordance with some implementations of the present concepts.

FIG. 13 shows how an example interferer 304 can block (e.g., interfere with) communications on a given channel at a given time within the wireless testing environment (204, FIG. 2). This interference allows the responses of the sending wireless device 202(1) and the receiving wireless device 202(2) to be detected by the observation component (208, FIG. 3). This example relates to three channels. In this example, the interferer 304 can create a burst of noise on channel 1 as indicated at 1302(1), such as for 0.5 seconds, for example. This noise is followed by a dwell period 1304(1) where no noise is generated, such as 0.01 seconds, for example. The interferer can then switch to channel 2 and deliver another burst of noise 1302(2) followed by another dwell period 1304(2). The interferer can then generate a third burst of noise on channel 3 at 1302(3) followed by an idle time 1306, such as 1.0 seconds, for example. Any transmissions by the sending wireless device 202(1) and/or the receiving wireless device 202(2) can be monitored when the channel is not being burst with noise. Upon expiration of the idle time 1306, the interferer 304 can repeat the process with another round of bursts of noise 1302(4)-1302(6) and interposed dwell periods 1304(3) and 1304(4). The interferer can continue the process for a specified number of cycles to allow the wireless checker (106, FIG. 3) to check the response of the wireless devices 202(1) and/or 202(2) to lost wireless communications.

METHOD EXAMPLES

Figure 14:
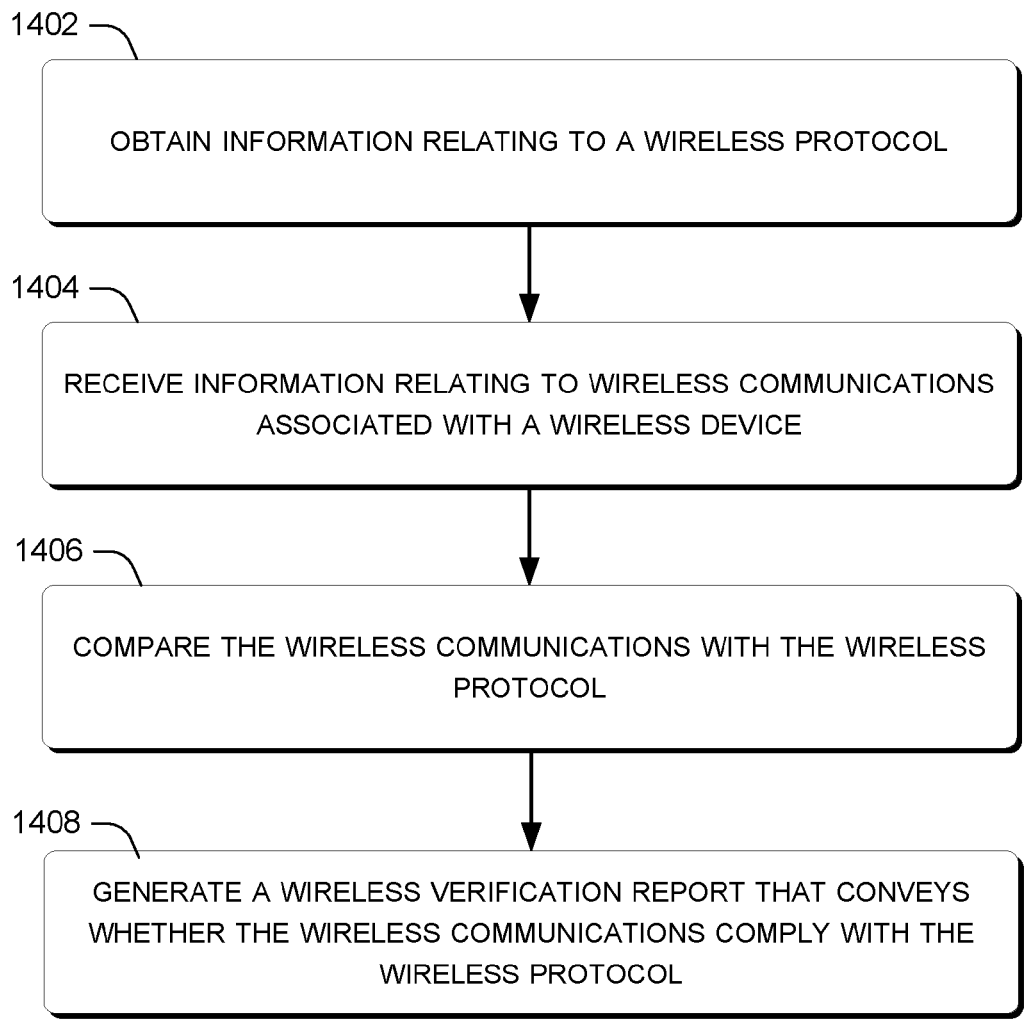
FIG. 14 shows an example wireless protocol verification flowchart in accordance with some implementations of the present concepts.

FIG. 14 shows an example computer implemented method or process 1400. In this case, block 1402 can obtain information relating to a wireless protocol. In one case, the wireless protocol itself can be obtained. In another case, aspects of the wireless protocol can be obtained. In some of these cases, the aspects can be related to (or define) various assertions. In one example, the entity that wrote and/or controls the wireless protocol could supply the wireless protocol and/or its aspects for comparison to devices that employ an implementation of the wireless protocol to determine compliance with the wireless protocol.

Block 1404 can receive information relating to wireless communications associated with a wireless device. For example, the information can relate to communications sent and/or received by the wireless device. The information can relate to various facets of the wireless communications, such as packet size, packet rate, packet strength (signal strength), packet origin, packet format, and/or ambient conditions, such as interference levels.

Block 1406 can compare the wireless communications with the wireless protocol. In one case, a state machine can be constructed that represents aspects of the wireless protocol. The wireless communications can be monitored and can be mapped to the state machine and then compared to assertions defined by the wireless protocol. Example state machines and assertions are described and illustrated above relative to FIGS. 4-7. In real life test scenarios, the wireless communications are likely to be simultaneously monitored for multiple (e.g., likely tens of) of aspects, with each aspect being compared to multiple assertions. Each of these assertions can be tracked for multiple potential states. As such, the comparing cannot be analogized to simple ad-hoc checking that can be performed by a user.

Block 1408 can generate a wireless verification report that conveys whether the wireless communications comply with the wireless protocol. For instance, the process can analyze the state machine and determine how many times the wireless communications exercised individual assertions. The analysis can also include whether the protocol followed (e.g., complied with) the exercised assertions. An example wireless verification report is described and illustrated relative to FIG. 3.

The described methods can be performed by the systems and/or devices, such as the wireless checker (106, FIG. 1), described above and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method (e.g., computer or device implemented method).

ADDITIONAL EXAMPLES

Various wireless protocol verification examples are described above. Additional examples are described below. One example includes a system comprising a test case generator configured to generate usage scenarios for a wireless device that includes a wireless implementation of a wireless protocol. It also comprises an environmental controller configured to influence a wireless condition in a wireless testing environment that includes the wireless device, and further comprises a wireless checker configured to automatically compare results from the wireless implementation on the wireless device from the usage scenarios to aspects defined in the wireless protocol.

Another example can include any of the above and/or below examples where the environmental controller comprises an attenuator, an interferer, or a packet jammer.

Another example can include any of the above and/or below examples where the wireless checker employs a monitor that is configured to process data from the wireless testing environment to determine whether the wireless implementation on the wireless device is conforming to an aspect of the wireless protocol.

Another example can include any of the above and/or below examples where the monitor compares the data from the wireless testing environment to an assertion relating to the aspect and determines whether the implementation of the wireless device complies with the assertion.

Another example can include any of the above and/or below examples where the system further comprises an observation component that is configured to obtain the data from the wireless testing environment.

Another example can include any of the above and/or below examples where the observation component comprises a packet sniffer, an oscillator, or a spectrum analyzer.

Another example can include any of the above and/or below examples where the observation component comprises multiple different observation components.

Another example can include any of the above and/or below examples where the system further comprises a packet aggregator that is configured to receive the data from the observation component, aggregate the data, and supply the aggregated data to the wireless checker.

Another example includes one or more computer-readable storage media having computer-executable instructions that, when executed by a processor of a device, cause the device to perform a method. The method comprises obtaining information relating to a wireless protocol, receiving information relating to wireless communications associated with a wireless device, comparing the wireless communications with the wireless protocol, and generating a wireless verification report that conveys whether the wireless communications comply with the wireless protocol.

Another example can include any of the above and/or below examples where the obtaining information comprises obtaining the wireless protocol or obtaining monitors relating to aspects of the wireless protocol.

Another example can include any of the above and/or below examples where the receiving information comprises receiving a packet trace of wireless packets sent by the wireless device.

Another example can include any of the above and/or below examples where the receiving information comprises receiving multiple types of information associated with a wireless testing environment that includes the wireless device.

Another example can include any of the above and/or below examples where the comparing comprises applying the wireless communications to a state machine that relates to an aspect of the wireless protocol.

Another example can include any of the above and/or below examples where the comparing further comprises comparing the state machine to an assertion defined by the wireless protocol.

Another example can include any of the above and/or below examples where the comparing further comprises tracking all possible scenarios of the state machine and using subsequent wireless communications to prune individual scenarios.

Another example includes a device comprising communication circuitry configured to receive signals relating to wireless communications associated with a wireless device. It further comprises a wireless checker configured to receive the signals and to automatically compare the wireless communications to aspects of a wireless protocol and to detect when the wireless communications relate to an individual aspect, and in instances where the wireless communications relate to the individual aspect, the wireless checker is further configured to determine whether the wireless communication complies with the individual aspect and to output a report that conveys the detected aspects and determined compliance.

Another example can include any of the above and/or below examples where the communication circuitry comprises wireless communication circuitry and where the wireless communication circuitry is manifest as an application specific integrated circuit (ASIC) or a field programmable gate array (FPGA).

Another example can include any of the above and/or below examples where the wireless checker is configured to leverage a monitor that is configured to analyze the signals in relation to the individual aspect.

Another example can include any of the above and/or below examples where the wireless checker further includes an assertion defined by the wireless protocol about the individual aspect and where the wireless checker is configured to compare the analyzed signals to the assertion to determine whether the wireless communication complies with the wireless protocol.

Another example can include any of the above and/or below examples where the wireless checker is configured to generate the monitor from the wireless protocol or where the wireless checker is configured to allow a user to define the monitor or where the wireless checker is configured to obtain the monitor from a remote source.

CONCLUSION

Although techniques, methods, devices, systems, etc., pertaining to wireless protocol authentication are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A system, comprising:
a processing device; and a memory having instructions which, when executed by the processing device, configure the processing device to:
provide usage scenarios for a wireless device that includes a wireless implementation of a wireless protocol;
influence a wireless condition in a wireless testing environment that includes the wireless device;
wirelessly obtain different potential packet traces by observing the wireless device when performing the usage scenarios;
process the different potential packet traces using different state transitions through a state machine and assign different probabilities to the different state transitions;
based at least on the different probabilities, select a particular state transition through the state machine to a particular state, the particular state being associated with a corresponding aspect defined in the wireless protocol;
determine whether observed behavior of the wireless device complies with the corresponding aspect defined in the wireless protocol; and
output a report that conveys whether the observed behavior of the wireless device complies with the corresponding aspect defined in the wireless protocol.

2. The system of claim 1, wherein the instructions, when executed by the processing device, configure the processing device to: influence the wireless condition using an attenuator, an interferer, or a packet jammer.

3. The system of claim 1, wherein the instructions, when executed by the processing device, configure the processing device to: influence the wireless condition by causing the wireless implementation on the wireless device to exercise various assertions in the state machine, the various assertions relating to various aspects of the wireless protocol.

4. The system of claim 3, wherein the instructions, when executed by the processing device, configure the processing device to: include, in the report, a number of times the wireless implementation exercises the various assertions and another number of times that the wireless implementation violates the various assertions.

5. The system of claim 3, wherein the instructions, when executed by the processing device, configure the processing device to: generate the usage scenarios.

6. The system of claim 1, further comprising:
a packet sniffer, an oscillator, or a spectrum analyzer configured to observe the wireless device when performing the usage scenarios.

7. The system of claim 1, further comprising:
a packet siffer, an oscillator, and a spectrum analyzer configured to observe the wireless device when performing the usage scenarios.

8. The system of claim 1, wherein the instructions, when executed by the processing deviceprocessor, configure the processing device processor to: select the particular state transition based at least on the particular state transition having a maximum likelihood relative to other state transitions for other potential packet traces.

9. A method comprising: receiving information relating to wireless communications associated with a wireless device;
identifying different potential packet traces represented by the information relating to the wireless communications;
processing the different potential packet traces by assigning different probabilities to different state transitions between different states of a state machine, the different potential packet traces being represented by different paths through the different states of the state machine;
inputting the information relating to the wireless communications to a state machine having associated assertions for a wireless protocol, individual assertions being associated with specific state transitions in the state machine;
based at least on the different probabilities, selecting a particular state transition through the state machine, based at least on a probability associated with the particular state transition, the particular state transition leading to a particular state associated with a particular aspect defined in a wireless protocol assertion;
determining whether the wireless communications comply with the particular aspect defined in the wireless protocol;
generating a wireless verification report that conveys whether the wireless communications comply with the particular aspect defined in the wireless protocol; and
outputting the wireless verification report.

10. The method of claim 9, further comprising: identifying, in the wireless verification report, instances when certain assertions associated with other states are violated and other instances where other assertions associated with the other states are exercised and followed.

11. The method of claim 9, wherein the information comprises wireless signals.

12. The method of claim 9, performed by a device other than the wireless device that performed the wireless communications.

13. The method of claim 9, wherein the particular state transition passes through three or more states.

14. The method of claim 13, wherein the particular aspect relates to a packet rate transmitted by the wireless device.

15. The method of claim 14, further comprising:
tracking multiple possible scenarios of the state machine and using subsequent wireless communications to prune individual scenarios.

16. A device, comprising: communication circuitry configured to receive signals relating to wireless communications associated with a wireless device; and a processing device configured to:

identify different potential packet traces represented by the signals relating to the wireless communications;

process the different potential packet traces by assigning different probabilities to different state transitions between different states of a state machine, the different potential packet traces being represented by different paths through the different states of the state machine;

based at least on the different probabilities, select a particular state transition through the state machine, the particular state transition leading to a particular state associated with a particular assertion associated with a wireless protocol;

determine whether the wireless communications comply with the particular assertion associated with the wireless protocol; and output a report that conveys whether the wireless communications comply with the particular assertion associated with the wireless protocol.

17. The device of claim 16, wherein the communication circuitry comprises wireless communication circuitry and wherein the wireless communication circuitry is manifest as an application specific integrated circuit (ASIC) or a field programmable gate array (FPGA).

18. The device of claim 16, wherein the state machine defines a first state transition representing a successful communication and a second state transition representing an unsuccessful communication.

19. The device of claim 16, wherein the processing device is further configured to: relate the different state transitions in the state machine to corresponding assertions that indicate compliance with the wireless protocol.

20. The device of claim 19, wherein the processing device is further configured to:

determine, using the state machine, whether the wireless device exercised individual assertions associated with: packet rate changes defined by the wireless protocol, noise burst handling defined by the wireless protocol, packet retries defined by the wireless protocol, and include, in the report, indications of whether the wireless device exercised the individual assertions.

\* \* \* \* \*